US012776891B2

(12) United States Patent
Roh et al.

(10) Patent No.: US 12,776,891 B2
(45) Date of Patent: Oct. 27, 2026

(54) ELECTRONIC DEVICE FOR CALIBRATION AND ITS CALIBRATION METHOD

(71) Applicant: MagnaChip Semiconductor, Ltd., Cheongju-si (KR)

(72) Inventors: Gil Sung Roh, Cheongju-si (KR); Hyeong Seok Kim, Cheongju-si (KR)

(73) Assignee: MagnaChip Semiconductor, Ltd., Cheongju-si (KR)

( * ) Notice: Subject to any disclaimer, the term of this patent is extended or adjusted under 35 U.S.C. 154(b) by 163 days.

(21) Appl. No.: 18/789,209

(22) Filed: Jul. 30, 2024

(65) Prior Publication Data

US 2025/0150252 A1 May 8, 2025

(30) Foreign Application Priority Data

Nov. 6, 2023 (KR) ........................ 10-2023-0151503

(51) Int. Cl.
*H04L 7/00* (2006.01)

(52) U.S. Cl.
CPC .................................. *H04L 7/0033* (2013.01)

(58) Field of Classification Search
CPC ....... H04L 7/0016; H04L 7/0033; H04L 7/10; G06F 13/4072; G06F 13/4282
See application file for complete search history.

(56) References Cited

U.S. PATENT DOCUMENTS 5,384,828 A * 1/1995 Brown .................... H04L 7/042 455/463
10,033,519 B2 7/2018 Duan et al.
11,018,658 B1 5/2021 Jeon
2014/0036904 A1* 2/2014 Mutou .............. H04W 56/0015 370/350
2025/0021153 A1* 1/2025 Zhang ................... G06F 1/3253

* cited by examiner

*Primary Examiner* — David B Lugo
(74) *Attorney, Agent, or Firm* — NSIP Law

(57) ABSTRACT

An electronic device includes a first electronic device including a signal generator configured to generate signals for a first calibration using a first pattern, and a second calibration using a random pattern; and a second electronic device. The second electronic device includes a signal processor configured to process reception data transmitted from the first electronic device; a pattern generator configured to generate pattern data for the second calibration; a re-synchronization point generator configured to generate re-synchronization point data to recover a noisy clock signal during the second calibration; and a calibration performer configured to perform the second calibration using the reception data, the pattern data, and the re-synchronization point data.

20 Claims, 9 Drawing Sheets

ELECTRONIC DEVICE FOR CALIBRATION AND ITS CALIBRATION METHOD

CROSS-REFERENCE TO RELATED APPLICATION

This application claims the benefit under 35 U.S.C. § 119(a) of Korean Patent Application No. 10-2023-0151503 filed on Nov. 6, 2023, in the Korean Intellectual Property Office, the entire disclosure of which is incorporated herein by reference for all purposes.

BACKGROUND

1. Field

The following description relates to an electronic device for performing calibration and its calibration method before transmitting real data between different electronic devices.

2. Description of Related Art

Various protocols are being used and developed for communication between different electronic devices. As one such protocol, there is C-PHY. C-PHY is an interface designed to achieve high data throughput in environments with limited data transfer speed, making it particularly suitable for mobile applications.

This C-PHY supports a calibration function. The calibration function should be supported by both a first electronic device (transmitter) and a second electronic device (receiver). When the first electronic device transmits data for calibration to the second electronic device, the second electronic device performs the calibration.

The calibration process involves finding an appropriate delay value for the delay circuit within a clock recovery of the second electronic device. Upon completion of calibration, a delay step with the highest margin among all delay steps in the delay circuit is selected, ensuring that the clock signal is appropriately generated in the clock recovery.

Electronic devices perform preamble calibration before transmitting real data. The preamble period defined in the C-PHY specification has a relatively simple pattern, resulting in relatively low jitter characteristics. Preamble calibration involves a simple pattern of repeating '3' or '1', so even if there is an abnormality in the recovered clock signal after performing preamble calibration, the device can receive normal data after a certain period of time.

After performing preamble calibration, additional calibration using alternative patterns, random patterns, or user-defined patterns may be performed. For reference, this specification will specify the patterns received by the second electronic device during the additional calibration period by selecting one of the alternative patterns, random patterns, or user-defined patterns, and alternative patterns may also be specified as PRBS9 patterns.

When such additional calibration is performed, jitter characteristics may be introduced in the additional calibration period, which may cause the clock signal to be generated incorrectly, and subsequently cause data to be received incorrectly. Generally, if the recovered clock signal is inaccurately generated during the additional calibration, there are limitations to recover it.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes a first electronic device including a signal generator configured to generate signals for a first calibration using a first pattern, and a second calibration using a random pattern; and a second electronic device. The second electronic device includes a signal processor configured to process reception data transmitted from the first electronic device; a pattern generator configured to generate pattern data for the second calibration; a re-synchronization point generator configured to generate re-synchronization point data to recover a noisy clock signal during the second calibration; and a calibration performer configured to perform the second calibration using the reception data, the pattern data, and the re-synchronization point data.

The second electronic device may perform the second calibration after the performing of the first calibration when the random pattern is received.

The second electronic device may further include a clock recovery configured to receive first to third signals from the first electronic device, and recover a clock signal using a final calibration value received from the calibration performer; and a data recovery configured to receive the first to third signals from the first electronic device, receive the recovered clock signal from the clock recovery, and output a delayed first reception signal, a delayed second reception signal, and a delayed third reception signal.

The electronic device may further include a storage unit configured to store the re-synchronization point data, wherein the re-synchronization point data includes two consecutive sets PRBS9.

The calibration performer may perform a first-order calibration of the second calibration using the reception data and the pattern data, and perform a second-order calibration of the second calibration using the reception data and the re-synchronization point data.

The calibration performer may include a comparison unit configured to compare the reception data with the pattern data; a re-synchronization performing unit configured to, when data synchronization does not match as a result of the comparison, perform a re-synchronization process using the reception data and the re-synchronization point data for searching for a re-synchronization point; and a calibration logic unit configured to, when the re-synchronization process is completed, continue to perform the second calibration from a point where the re-synchronization process is complete.

The calibration performer, in response to the re-synchronization process being completed, may provide matched re-synchronization point data to the pattern generator.

In response to the re-synchronization process not being completed by the re-synchronization performing unit, the calibration logic unit may perform the re-synchronization process again after changing a delay step of delay circuits in the clock recovery.

The calibration performer may perform re-synchronization process on all delay steps of delay circuits in the clock recovery included in the second calibration period.

The first electronic device and the second electronic device may be configured to perform a data transmission mode and a calibration performing mode. The data transmission mode and the calibration performing mode may be set by the second electronic device.

In another general aspect, an electronic device includes a first electronic device and a second electronic device. The second electronic device, after performing preamble calibration, performs an alternative calibration upon receiving a random pattern from the first electronic device. The alternative calibration, in response to synchronization between reception data transmitted from the first electronic device and pattern data generated by the second electronic device not matching, in order to search for a re-synchronization point, the second electronic device performs a re-synchronization process using the re-synchronization point data generated at the re-synchronization point and the reception data.

In response to the re-synchronization process being completed, the alternative calibration may be continued.

In response to the re-synchronization process being completed, the second electronic device may perform uploading matched re-synchronization point data.

The re-synchronization process may be performed on all delay steps during the alternative calibration period.

In response to the re-synchronization not being completed at a predetermined delay step during the re-synchronization process, the delay step may be changed to a next delay step and then re-synchronization process is performed again.

In response to the synchronization between the reception data and the pattern data matching, the re-synchronization process may not be performed.

In another general aspect, a calibration method for an electronic device, includes performing preamble calibration using a first electronic device and a second electronic device; checking, after the performing of the preamble calibration, a random pattern from the first electronic device using the second electronic device; performing an alternative calibration in response to the random pattern being confirmed; checking for occurrence of a noisy clock signal during the alternative calibration; performing a re-synchronization process to recover the alternative calibration to normal in response to the abnormal clock signal occurring; and continuing to perform the alternative calibration in response to the re-synchronization process being completed.

The performing of the alternative calibration may include comparing data synchronization between the reception data transmitted from the first electronic device and the pattern data of the second electronic device; and continuing to perform the alternative calibration if the data synchronization matches as a result of the comparison.

The performing of the re-synchronization process may include reception data transmitted from the first electronic device with pre-generated re-synchronization point data; and completing the re-synchronization process if data synchronization matches as a result of the comparison.

The calibration method may include changing a delay step in response to the data synchronization mismatching, searching for a re-synchronization point at the changed delay step, and performing the re-synchronization process again using the searched re-synchronization point.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
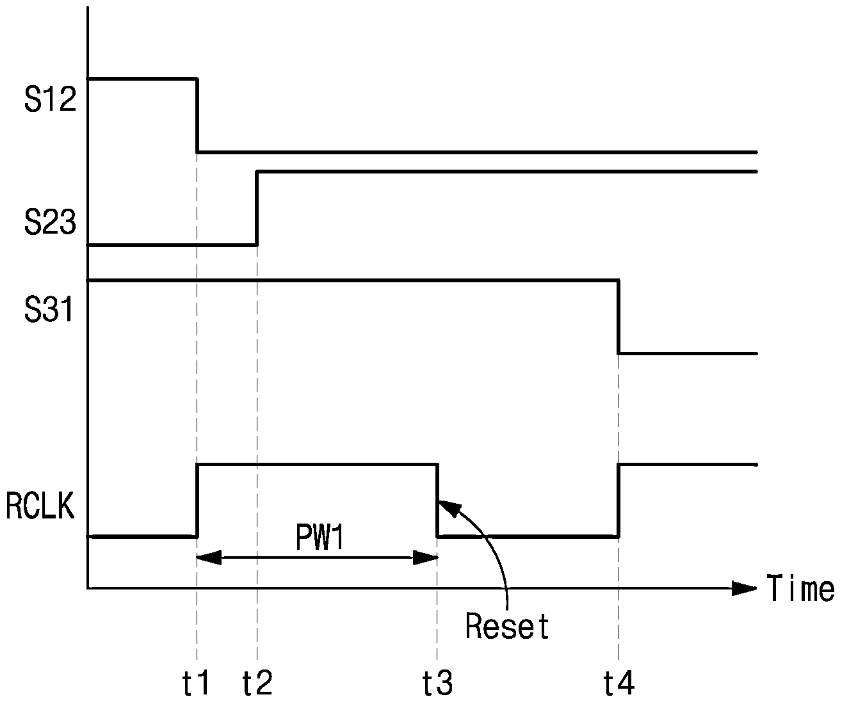
FIG. 1 illustrates a timing diagram explaining the operation of recovering a clock signal during the calibration period.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

The terms indicating a part such as "part" or portion" used herein to mean that the component may represent a device that may include a specific function, a software that may include a specific function, or a combination of device and software that may include a specific function, but it is not necessarily limited to the function expressed. This is only provided to help a more general understanding of one or more examples herein, Various modifications and variations are possible from these descriptions by those of ordinary skill in the art to which the one or more examples pertains.

In addition, it should be noted that all electrical signals used herein are examples, and when an inverter or the like is additionally provided in the circuit in accordance with one or more embodiments, the signs of all electrical signals to be described below may be reversed. Accordingly, the scope of the embodiments is not limited to the direction of the signal.

FIG. 1 illustrates a timing diagram explaining the operation of recovering a clock signal during the calibration period.

Referring to FIG. 1, it is explained that a second electronic device (receiver) generates a recovery clock (RCLK) signal based on reception signals S12, S23, S31, and a reset signal. The first rising edge of the recovery clock (RCLK) occurs in response to the transition of the reception signal S12 (t1), and the first falling edge occurs in response to the reset signal (t3). The pulse width PW1 of the recovery clock (RCLK) is related to an eye-opening region included in the data reception period.

The first falling edge that occurs after the first rising edge of the recovery clock (RCLK) is generated using delay circuits commonly used to recover a clock signal from the reception signals S12, S23, S31.

Figure 2:
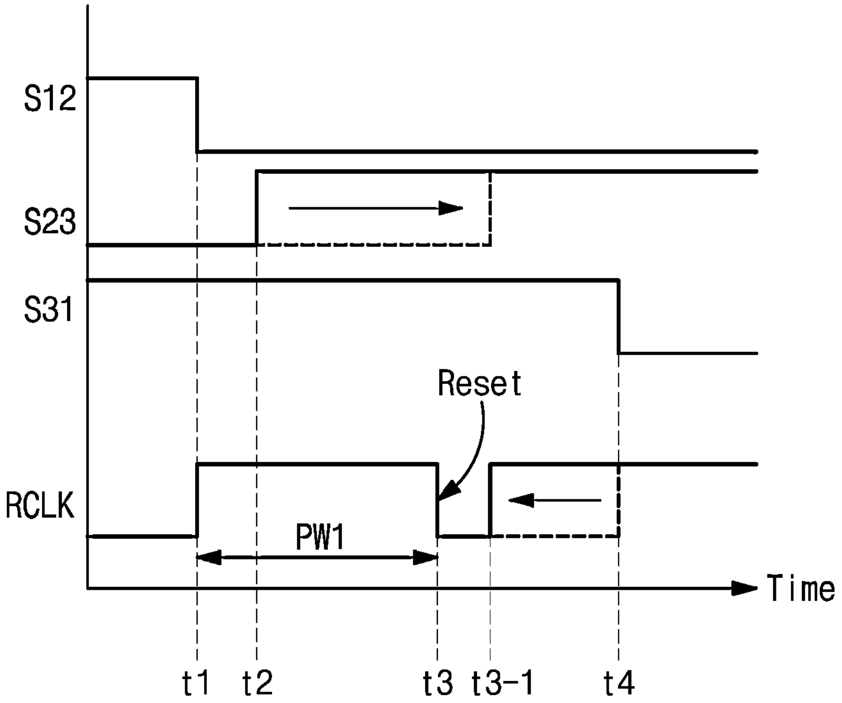
FIG. 2 illustrates a timing diagram explaining the operation of an abnormal or noisy clock signal during a calibration period in connection with the present disclosure.

FIG. 2 illustrates a timing diagram explaining the operation of an abnormal or noisy clock signal during a calibration period in connection with the present disclosure.

After the preamble calibration is performed, more complex patterns, such as random patterns rather than simple patterns, may be received during the alternative calibration period.

Then, it is likely that jitter elements such as channel attenuation or Inter-Symbol Interference (ISI) are added during the alternative calibration period. Therefore, referring to FIG. 2 compared to FIG. 1, a second rising edge of the abnormal recovery clock (RCLK) may be generated at the time t3-1 due to a delay caused by jitter and others, assuming that the next reception signal S23 is received at the time t3-1. Subsequently, issues arise with the second electronic device (receiver) receiving data incorrectly.

Figure 3:
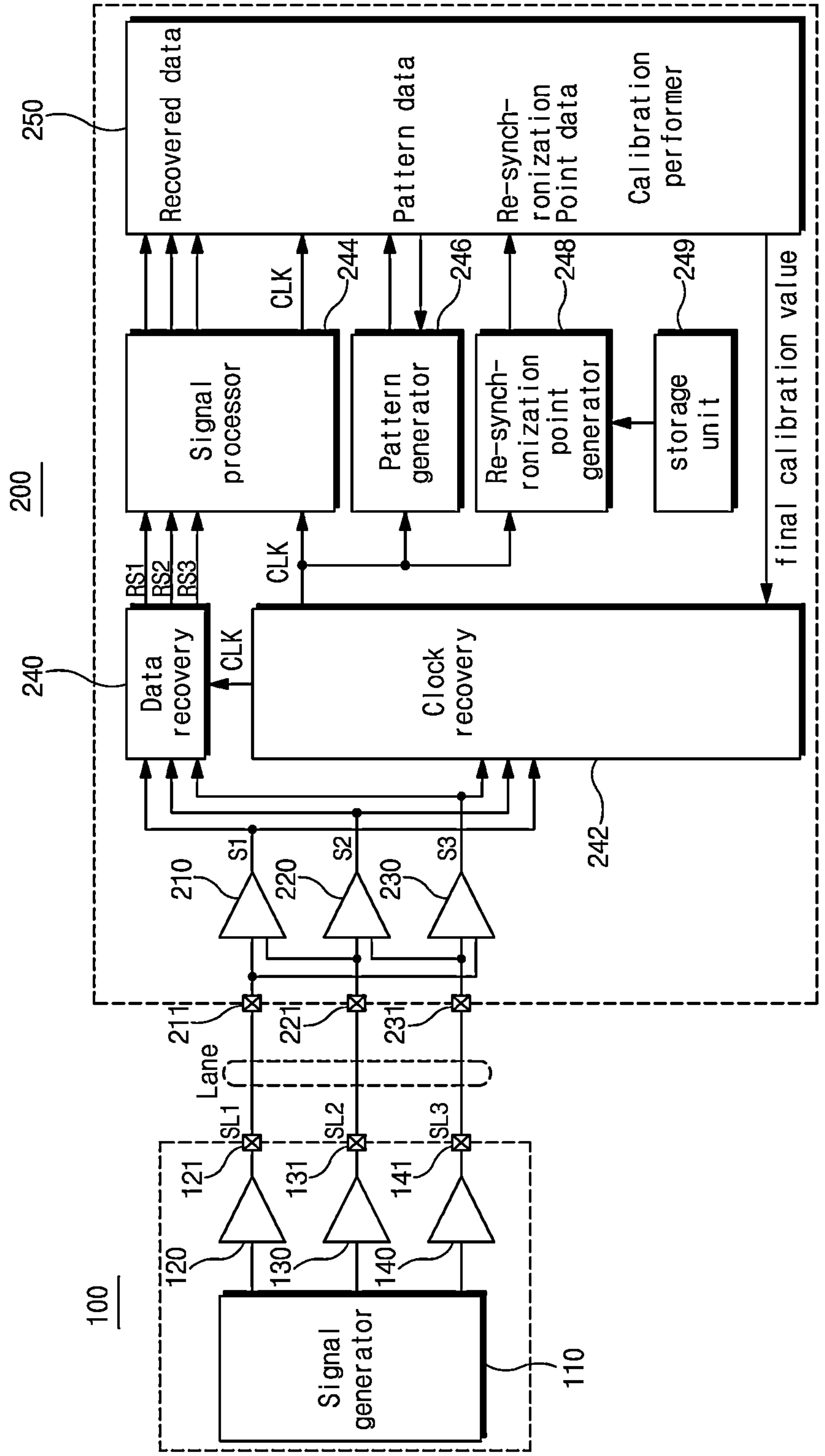
FIG. 3 illustrates a block diagram or explaining an electronic device for calibration in accordance with examples of the present disclosure.

FIG. 3 illustrates a block diagram for explaining an electronic device for calibration in accordance with examples of the present disclosure.

Referring to FIG. 3, the electronic device according to the present disclosure may include a first electronic device 100 and a second electronic device 200. The first electronic device 100 is a transmitter, which may be an Application Processor (AP). The second electronic device 200 is a receiver, which may be an Integrated Circuit (IC).

The first electronic device 100 may include a signal generator 110, a first transmitter 120, a second transmitter 130, and a third transmitter 140.

The signal generator 110 may generate first data and second data. The first data may be data for preamble calibration. The second data may be data for performing additional calibration using alternative patterns, random patterns, or user defined patterns.

The first transmitter 120, the second transmitter 130, and the third transmitter 140 may be connected to a first signal line SL1, a second signal line SL2, and a third signal line SL3 through a first transmission terminal 121, a second transmission terminal 131, and a third transmission terminal 141, respectively. The first transmitter 120, the second transmitter 130, and the third transmitter 140 may transmit signals based on one of various communication protocols.

For example, the first transmitter 120, the second transmitter 130, and the third transmitter 140 may transmit signals based on the protocol of the C-PHY determined during the Mobile Industry Processor Interface (MIPI).

The first electronic device 100 may transmit signals to the second electronic device through the first signal line SL1, the second signal line SL2, and the third signal line SL3. The first signal line SL1, the second signal line SL2, and the third signal line SL3 form a lane and may transmit signals associated with each other, for example, signals that transition (or toggle) in association with each other. While the example shows one lane being formed, it will be appreciated that the first electronic device and the second electronic device may communicate via two or more lanes.

The second electronic device 200 may receive signals through the first signal line SL1, the second signal line SL2, and the third signal line SL3. The second electronic device 200 may be configured to include a first receiver 210, a second receiver 220, a third receiver 230, a data recovery 240, a clock recovery 242, a signal processor 244, a pattern generator 246, a re-synchronization point generator 248, a storage unit 249, and a calibration performer 250.

The first receiver 210, the second receiver 220, and the third receiver 230 may receive signals from a first signal line SL1, a second signal line SL2, and a third signal line SL3 through a first reception terminal 211, a second reception terminal 221, and a third reception terminal 231, respectively.

The first receiver 210 may output a difference between a signal received through the first signal line SL1 from the first reception terminal 211 and a signal received through the second signal line SL2 from the second reception terminal 221 as a first signal S1. The second receiver 220 may output a difference between a signal received through the second signal line SL2 from the second reception terminal 221 and a signal received through the third signal line SL3 from the third reception terminal 231 as a second signal S2. The third receiver 230 may output a difference between a signal received through the third signal line SL3 from the third reception terminal 231 and a signal received through the first signal line SL1 from the first reception terminal 211 as a third signal S3.

The clock recovery 242 may receive the first signal S1, the second signal S2, the third signal S3, and a final calibration value. The clock recovery 242 may recover the clock signal CLK using the final calibration value to receive the real data.

The data recovery 240 may receive the first signal S1, the second signal S2, the third signal S3, and the clock signal CLK. Then, it may latch a delayed first signal DS1, a delayed second signal DS2, and a delayed third signal DS3 synchronized with the clock signal CLK and may output the latched results as a delayed first reception signal RS1, a delayed second reception signal RS2, and a delayed third reception signal RS3.

After receiving the delayed first reception signal RS1, the delayed second reception signal RS2, the delayed third reception signal RS3, and the clock signal CLK, the signal processor 244 may operate in response to the delayed first reception signal RS1, the delayed second reception signal RS2, and the delayed third reception signal RS3. The signals processed by the signal processor 244 are provided to the calibration performer 250 as reception data (that is, Recovered data).

The pattern generator 246 may receive the clock signal CLK recovered by the clock recovery 242. After the preamble calibration is performed, the pattern generator 246 may generate pattern data for performing additional calibration. The pattern generator 246 may transmit the pattern data to the calibration performer 250. Additional calibration may involve alternative calibration or user-defined calibration. Alternative calibration is referred to as Pseudo Random Binary Sequence (PRBS).

The re-synchronization point generator 248 may generate re-synchronization point data to continue to perform additional calibration if data transmission failure occurs due to an abnormal or noisy clock signal while performing additional calibration. A re-synchronization process may be desired in order to continue additional calibration, and for this re-synchronization process, the re-synchronization point generator 248 provides the re-synchronization point data to the calibration performer 250. During the re-synchronization process, a comparison is made between the re-synchronization point data and recovered data, and even during this re-synchronization process, the pattern generator 246 may continue to provide pattern data to the calibration performer 250.

Once the re-synchronization process is completed, the calibration performer 250 may provide a matched re-synchronization point data obtained from the re-synchronization point data received from the re-synchronization point generator 248 to the pattern generator 246. Therefore, the second electronic device 200 may monitor data transmitted by the first electronic device 100, using the re-synchronization point data, and continue to perform additional calibration if the data is received successfully.

Additionally, information on the generated re-synchronization point data may be stored in a storage unit 249, such as non-volatile memory.

The calibration performer 250 may perform additional calibration when the second electronic device 200 becomes capable of receiving data successfully. The calibration performer 250 may receive reception data (recovered data) from the signal processor 244, pattern data from the pattern generator 246, and re-synchronization point data from the re-synchronization point generator 248.

Figure 4:
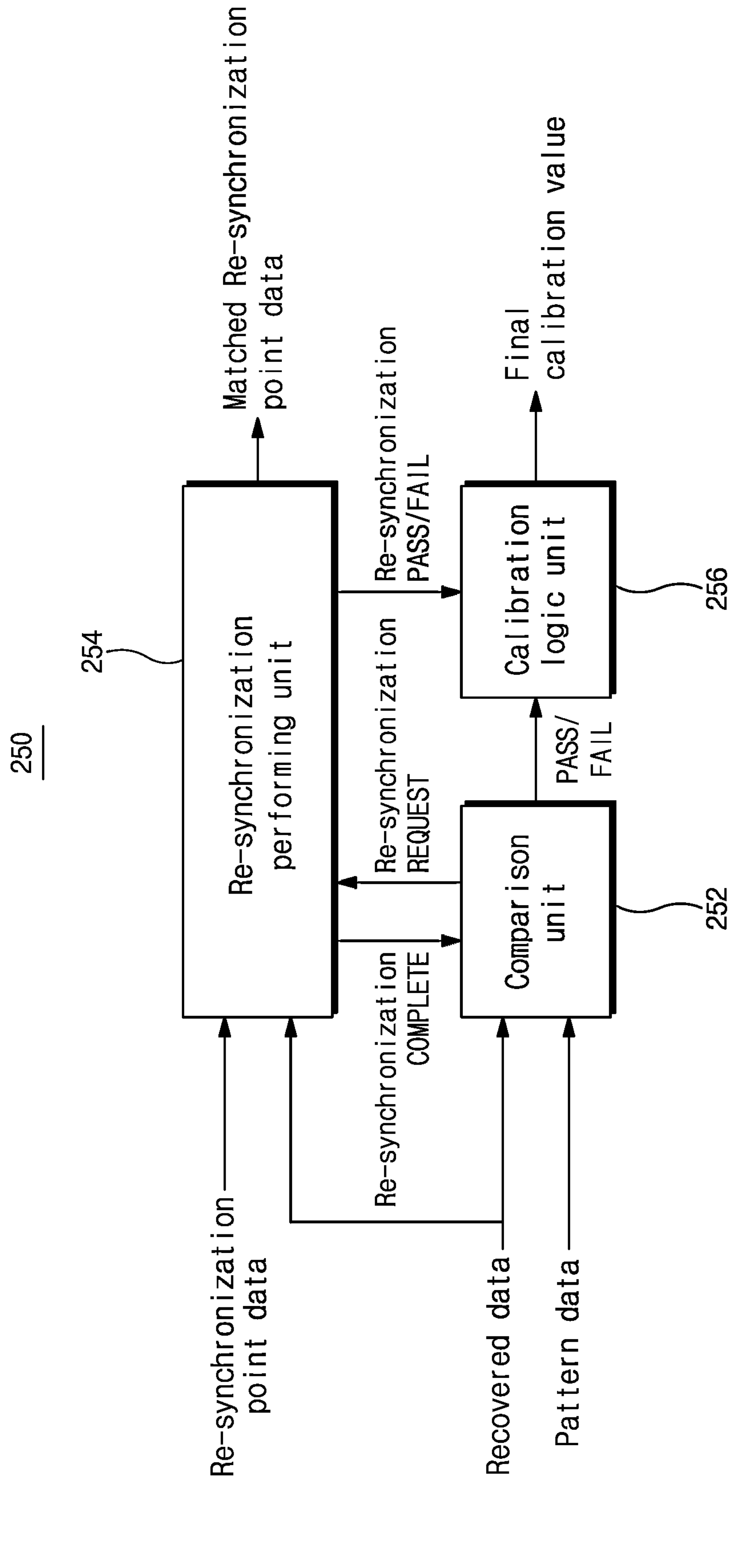
FIG. 4 illustrates a block diagram showing the calibration performer of FIG. 3.

FIG. 4 illustrates a block diagram showing the calibration performer 250 of FIG. 3.

Referring to FIG. 4, the calibration performer 250 may include a comparison unit 252, a re-synchronization performing unit 254, and a calibration logic unit 256.

The comparison unit 252 may compare the recovered data with the pattern data. The comparison result may indicate whether the data synchronization is matched or not. Based on the comparison result, a data PASS signal or a data FAIL signal may be transferred to the calibration logic unit 256. If the data synchronization does not match and a data FAIL signal occurs, the comparison unit 252 sends a re-synchronization REQUEST signal to the re-synchronization performing unit 254.

The re-synchronization performing unit 254 may receive the recovered data and the re-synchronization point data. The re-synchronization performing unit 254 may perform a re-synchronization process using the recovered data and the pre-stored re-synchronization point data in accordance with a re-synchronization REQUEST signal if the recovered data and the pattern data are not synchronized due to an abnormal or noisy clock signal occurring during the additional calibration performance. The re-synchronization REQUEST signal is generated based on a comparison result of the comparison unit 252.

When performing alternative calibration according to the present disclosure, one or more PRBS9 data sequences may be used as re-synchronization point data. The re-synchronization point data may be defined by one or more consecutive sets of PRBS9 data for re-synchronization accuracy and may be stored in the storage unit 249, such as non-volatile memory or register. Depending on the properties of the storage unit 249, it is possible to vary multiple re-synchronization points to store re-synchronization point data.

The re-synchronization process of the re-synchronization performing unit 254 may involve a process of moving from a corresponding delay step where an abnormal or noisy clock signal occurs to the next delay step (e.g., the $2^{nd}$ delay step) and comparing the recovered data with the re-synchronization point data. If the re-synchronization process is not performed during the $2^{nd}$ delay step, it may continue by moving to the next delay step (e.g., the $3^{rd}$ delay step) and performing the re-synchronization process. Even during this re-synchronization process, the pattern generator 246 may transmit the pattern data to the calibration performer 250.

Upon completion of the re-synchronization process, the calibration performer 250 may upload the matched re-synchronization point data to the pattern generator 246.

Upon completion of the re-synchronization process, the re-synchronization performing unit 254 transmits a re-synchronization COMPLETE signal to the comparison unit 252, and the comparison unit 252 starts comparing the recovered data with the pattern data.

The calibration logic unit 256 may receive the re-synchronization PASS/FAIL signal based on the re-synchronization process results from the re-synchronization performing unit 254. If the calibration logic unit 256 receives a re-synchronization PASS signal, it determines that normal DATA can be received at the corresponding delay step and continues to perform additional calibration.

On the other hand, if the calibration logic unit 256 receives a re-synchronization FAIL signal, it determines that normal DATA cannot be received at the corresponding delay step. Consequently, it moves to the next delay step and performs the re-synchronization process again.

According to the present disclosure, the performance modes between the first electronic device 100 and the second electronic device 200 may be classified into the following four modes:

① First mode: Normal Data Transmission Mode (Calibration not performing mode)

② Second mode: Preamble Calibration Mode (Calibration performing mode)

③ Third mode: Alternative Calibration Mode (Calibration performing mode)

④ Fourth mode: User Defined Calibration Mode (Calibration performing mode)

The sequences for each of the four performance modes are configured as follows.

The Normal Data Transmission Mode, the first mode, consists of "Preamble '3'+sync word+data". The normal data transmission mode does not perform calibration, and may simply be a mode for transmitting data.

The Preamble Calibration Mode, the second mode, consists of "Calibration preamble '1'+sync word+data". The second mode performs calibration using a simple pattern where '1' is repeated.

On the other hand, the Alternative Calibration Mode (Third mode) or the User Defined Calibration Mode (Fourth mode) is a calibration mode utilizing a random pattern, possibly related to the present disclosure. The sequence for Alternative Calibration Mode may be "Calibration preamble '1'+Alternative calibration+sync word+data", and the sequence for User Defined Calibration Mode may be "Calibration preamble '1'+User defined calibration+sync word+data".

According to the present disclosure, after performing preamble calibration, additional calibration is performed using the Alternative sequence (Third mode) or the User Defined sequence (Fourth mode). The Alternative sequence or User Defined sequence allows for calibration to be performed successfully by addressing issues caused by abnormal or noisy clock signals that may arise due to random patterns rather than simple patterns.

The calibration performing mode may be set by the first electronic device 100, which is a transmitter, but it may also be set by the second electronic device 200, which is a receiver. In other words, the second electronic device 200 may allow for either performing only preamble calibration or performing additional calibration besides the preamble calibration.

Figure 5:
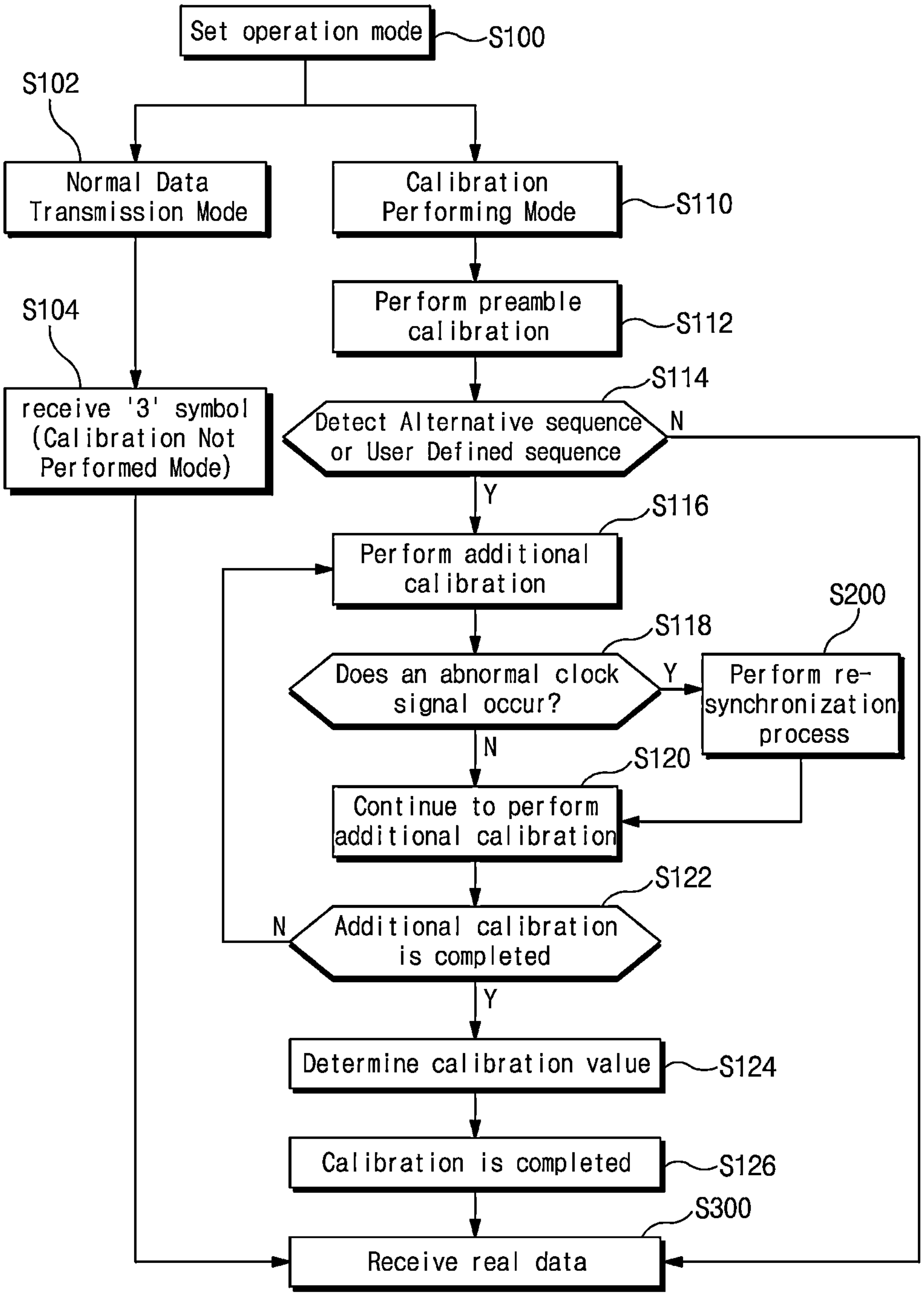
FIG. 5 illustrates a flow chart showing the process of the operating mode between the first electronic device and the second electronic device.

FIG. 5 illustrates a flow chart showing the process of the operating mode between the first electronic device and the second electronic device.

Among the first electronic device 100 and the second electronic device 200, the second electronic device 200 may set the operating mode (S100). Before the start of the operating mode, the second electronic device 200 may be configured to operate the Normal Data Transmission Mode or the Calibration Performing mode.

Among the operating modes, when the Normal Data Transmission Mode is set (S102), the device can receive the '3' symbol and receive real data (S104, S300).

On the other hand, when the Calibration performing mode is set (S110), the preamble calibration may be performed (S112). Subsequently, the second electronic device 200 determines whether pattern information for performance of additional calibration, such as Alternative sequence or User Defined sequence, is transmitted or not after the performance of the preamble calibration (S114). As a result of the determination, if it is determined that such pattern information is not received (N in S114), the second electronic device 200 may proceed with the process of receiving real data (S300).

During the determination process, if the Alternative sequence or User Defined sequence is detected, additional calibration may be performed (S116). While performing the additional calibration, it may be desired to continually monitor the occurrence of abnormal or noisy clock signals (S118). During the additional calibration, if an abnormal or noisy clock signal does not occur (N in S118), a process for receiving real data is performed after the completion of the additional calibration (S120, S122, S124, S126, S300).

However, when an abnormal or noisy clock signal occurs during the determination process (Y in S118), it is not possible to receive real data, and thus, it is not possible to perform additional calibration, so a re-synchronization process, which is the process of recovering to the normal calibration process, may be performed (S200). In an example, the real data can be received only after the re-synchronization process is completed. Recovery to the normal calibration process is accomplished by the re-synchronization process of the present disclosure, as illustrated in FIG. 6.

Figure 6:
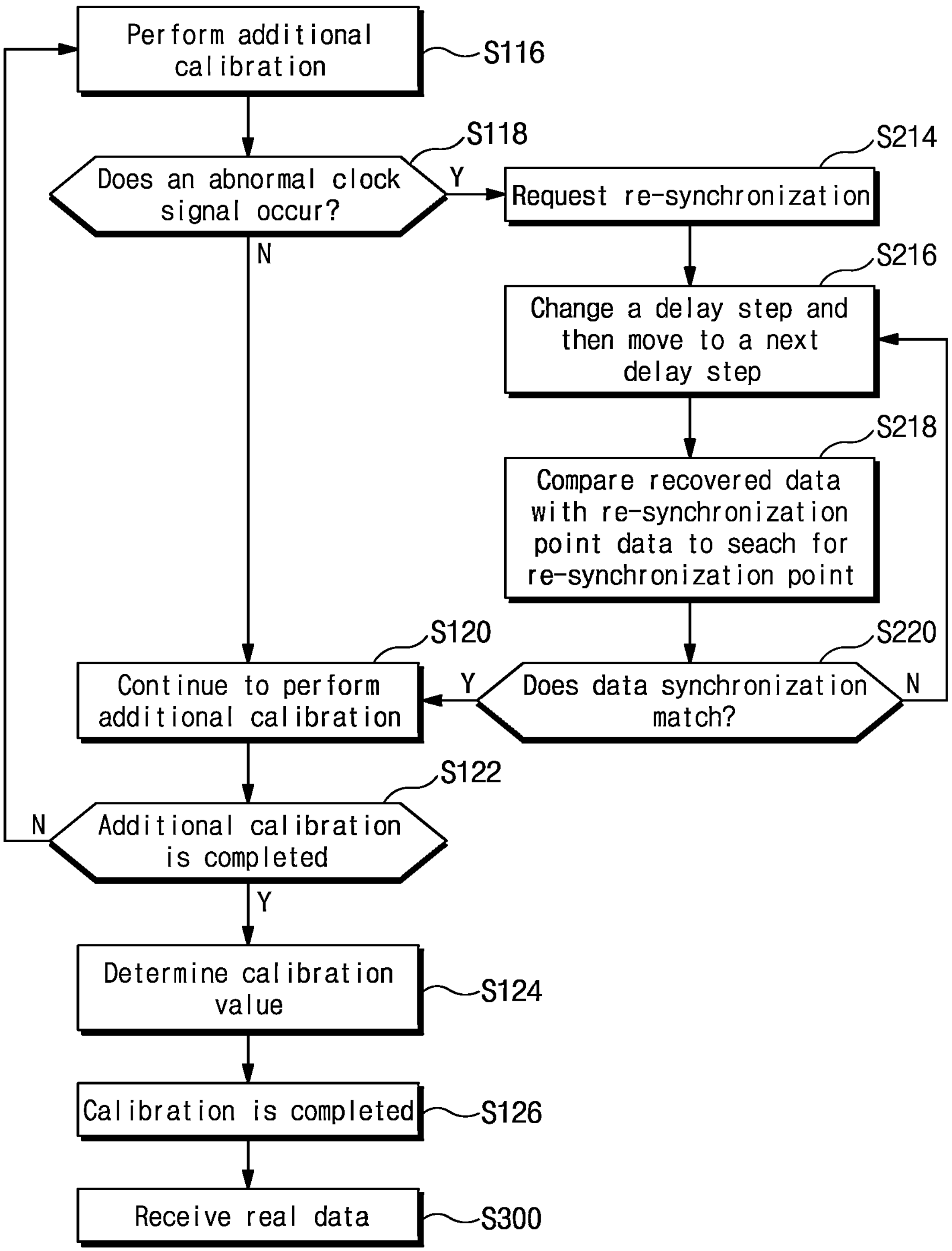
FIG. 6 illustrates a flow chart showing the process of recovering a clock signal in the event of an abnormal or noisy clock signal occurrence during the performance of additional calibration according to the present disclosure.

FIG. 6 illustrates a flow chart showing the recovery process to normal calibration in case of the occurrence of an abnormal or noisy clock signal during the performance of additional calibration according to the present disclosure. After performing the preamble calibration, if an Alternative sequence or User Defined sequence is detected, the second electronic device 200 performs additional calibration (S116).

During the performance of the additional calibration, the calibration performer 250 of the second electronic device 200 judges whether a clock signal is abnormally generated. The abnormal or noisy clock signal may include instances where the synchronization between the recovered data transmitted by the first electronic device 100 and the pattern data of the second electronic device 200 does not match.

According to the judgement process, an abnormal or noisy clock signal does not occur (N in S118), additional calibration is continued as previously mentioned (S120), and when the additional calibration is completed (S122), real data can be received (S300). On the other hand, when an abnormal or noisy clock signal occurs (Y in S118), a re-synchronization process is performed according to the re-synchronization request (S214).

The re-synchronization process may be a process in which the re-synchronization performing unit 254 re-synchronizes the recovered data with the re-synchronization point data. The re-synchronization process changes a delay step other than a delay step where the current mismatch of data synchronization occurs and moves to a next delay step (e.g., $2^{nd}$ delay step) and then is performed (S216). Subsequently, a process of comparing the re-synchronization point data with the recovered data received from the first electronic device 100 for searching for the re-synchronization point is performed (S218).

Based on the comparison process, when the synchronization between the recovered data and re-synchronization point data is determined to match (Y in S220), it is judged that data can be received normally from that point onward and additional calibration is performed continuously (S120). The additional calibration may be performed for all delay steps included in the calibration period. All of the delay steps are delay values of the delay circuits existing in the clock recovery 242 of the second electronic device 200. When the performance of additional calibration is completed (S122), an appropriate calibration value is determined among them (S124). After all of the calibration processes are completed (S126), real data is received using the final calibration value determined above (S300).

However, if the data synchronization does not match during the re-synchronization process (N in S220), the re-synchronization at the corresponding delay step is considered a failure. Therefore, the delay step is changed, and the process moves to the next delay step (S216).

The subsequent re-synchronization process involves comparing the recovered data received from the first electronic device 100 with the re-synchronization point data as mentioned above, and depending on whether the data synchronization matches, the calibration is continued, or the re-synchronization process is performed again in the next delay step.

Figure 7:
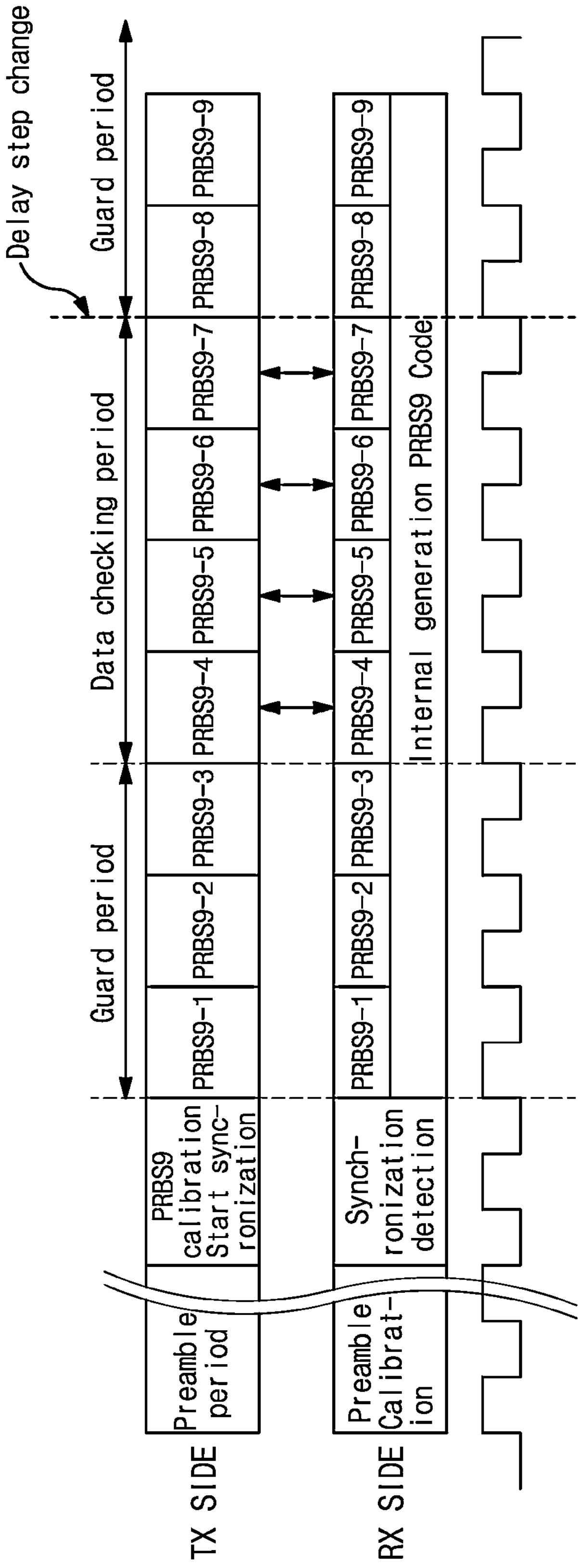
FIGS. 7 and 8 illustrate timing diagrams during the alternative calibration process according to an example of the present disclosure.
Figure 8:
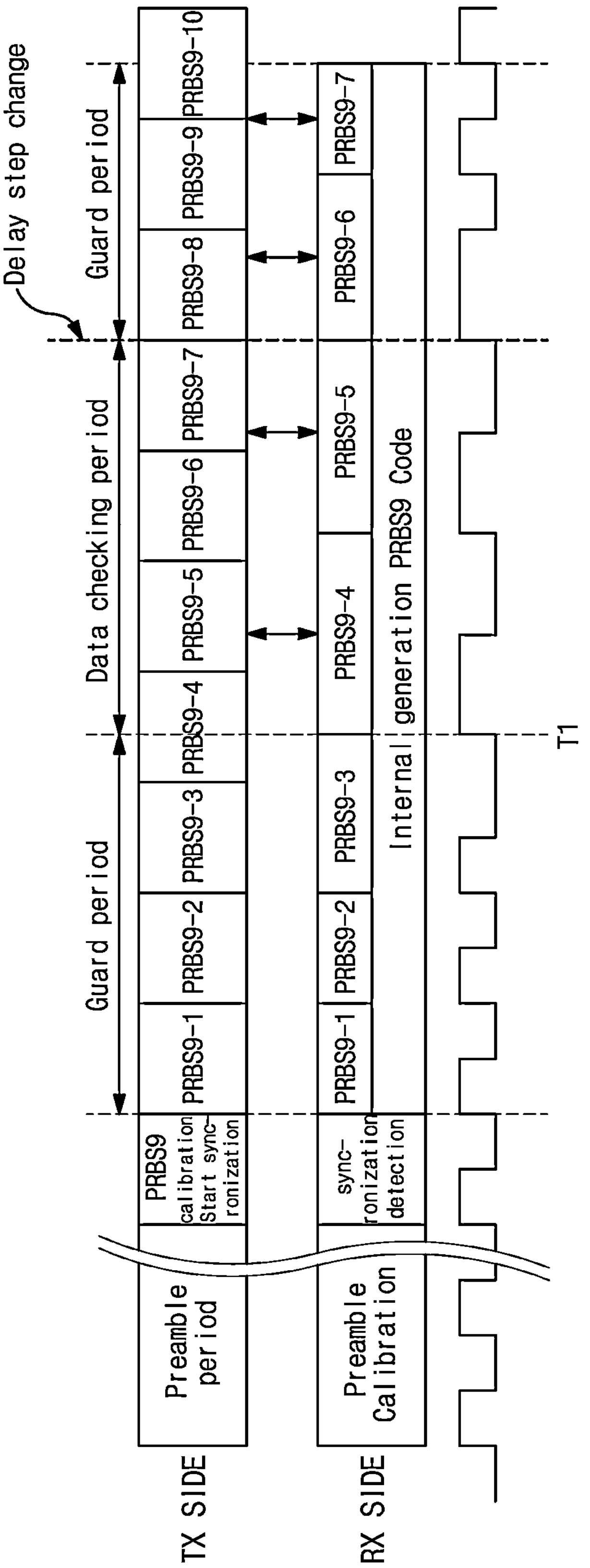

FIGS. 7 and 8 illustrate timing diagrams during the alternative calibration process according to an example of the present disclosure. FIG. 7 illustrates the case where the synchronization between the transmitted data (TX SIDE) and received data (RX SIDE) does match, while FIG. 8 illustrates the case where the synchronization between the transmitted data (TX SIDE) and received data (RX SIDE) does not match.

As shown in FIG. 7, when a clock signal is generated normally, synchronization between the transmitted data and received data matches, and calibration can be performed normally. On the other hand, as shown in FIG. 8, when an abnormal or noisy clock signal occurs at time T1, the synchronization between the transmitted data and received data does not match. Therefore, after time T1 onwards, it can be determined that all received data are in error.

Figure 9:
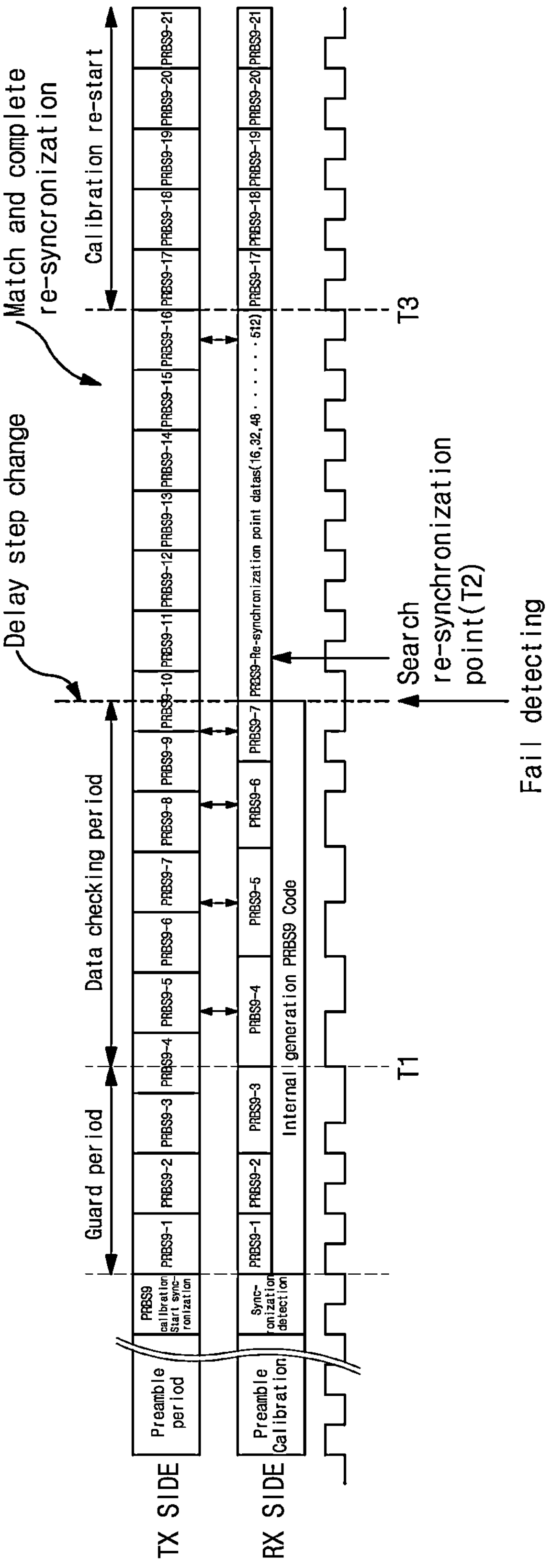
FIG. 9 illustrates a timing diagram explaining a re-synchronization process in the event of an abnormal or noisy clock when performing an alternative calibration according to an example of the present disclosure.

FIG. 9 illustrates a timing diagram explaining a re-synchronization process in the event of an abnormal or noisy clock when performing an alternative calibration according to an example of the present disclosure.

Referring to FIG. 9, at time T1, the occurrence of an abnormal or noisy clock signal at time T1 can be detected by comparing the recovered data with the pattern data, and a re-synchronization is made to start the re-synchronization process. When the re-synchronization process is performed, the delay step is changed, and then the re-synchronization point is searched at the changed delay step. For example, starting at time T2, it searches for adjacent re-synchronization points by comparing the re-synchronization point data with the recovered data.

If the recovered data matching the re-synchronization point data is received according to the re-synchronization process, such as at point T3, it is determined that the data can be received normally from then on, and additional calibration is continued.

As such, it can be seen that the present disclosure may receive data normally through a resynchronization process when data is not received due to an abnormal or noisy clock signal occurring during the alternative calibration after the preamble calibration is performed.

The purpose of the present disclosure is to provide an electronic device for calibration and its calibration method to recover a clock signal generated abnormally during an alternative calibration period.

According to this disclosure, after performing pre-amble calibration between a first electronic device and a second during the performance of alternative calibration due to the occurrence of a random pattern, even if an abnormal clock signal occurs, the clock signal can be recovered through a re-synchronization process, which has the effect of preventing the problem of not receiving data.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:

a first electronic device comprising a signal generator configured to generate signals for a first calibration using a first pattern, and a second calibration using a random pattern; and a second electronic device comprising:

a signal processor configured to process reception data transmitted from the first electronic device;

a pattern generator configured to generate pattern data for the second calibration;

a re-synchronization point generator configured to generate re-synchronization point data to recover a noisy clock signal during the second calibration; and a calibration performer configured to perform the second calibration using the reception data, the pattern data, and the re-synchronization point data.

2. The electronic device of claim 1, wherein the second electronic device performs the second calibration after the performing of the first calibration in response to the random pattern being received.

3. The electronic device of claim 1, wherein the second electronic device further comprises:

a clock recovery circuit configured to receive first to third signals from the first electronic device, and recover a clock signal using a final calibration value received from the calibration performer; and a data recovery circuit configured to receive the first to third signals from the first electronic device, receive the recovered clock signal from the clock recovery circuit, and output a delayed first reception signal, a delayed second reception signal, and a delayed third reception signal.

4. The electronic device of claim 1, further comprising:

a storage medium configured to store the re-synchronization point data, wherein the re-synchronization point data comprises two consecutive sets PRBS9.

5. The electronic device of claim 1, wherein the calibration performer performs a first-order calibration of the second calibration using the reception data and the pattern data, and performs a second-order calibration of the second calibration using the reception data and the re-synchronization point data.

6. The electronic device of claim 1, wherein the calibration performer comprises:

a comparator configured to compare the reception data with the pattern data;

a re-synchronization performer configured to, when data synchronization does not match as a result of the comparison, perform a re-synchronization process using the reception data and the re-synchronization point data for searching for a re-synchronization point; and a calibrator configured to, when the re-synchronization process is completed, continue to perform the second calibration from a point where the re-synchronization process is complete.

7. The electronic device of claim 6, wherein the calibration performer, in response to the re-synchronization process being completed, provides matched re-synchronization point data to the pattern generator.

8. The electronic device of claim 6, wherein, in response to the re-synchronization process not being completed by the re-synchronization performer, the calibrator performs the re-synchronization process again after changing a delay step of delay circuits in the clock recovery circuit.

9. The electronic device of claim 1, wherein the calibration performer performs re-synchronization process on all delay steps of delay circuits in the clock recovery circuit included in a period of the second calibration.

10. The electronic device of claim 1, wherein the first electronic device and the second electronic device are configured to perform a data transmission mode and a calibration performing mode, and wherein the data transmission mode and the calibration performing mode are set by the second electronic device.

11. An electronic device, comprising:

a first electronic device and a second electronic device, wherein the second electronic device, after performing preamble calibration, performs an alternative calibration upon receiving a random pattern from the first electronic device, wherein the alternative calibration, in response to synchronization between reception data transmitted from the first electronic device and pattern data generated by the second electronic device not matching, in order to search for a re-synchronization point, the second electronic device performs a re-synchronization process using a re-synchronization point data generated at the re-synchronization point and the reception data.

12. The electronic device of claim 11, wherein, in response to the re-synchronization process being completed, the alternative calibration is continued.

13. The electronic device of claim 11, wherein, in response to the re-synchronization process being completed, the second electronic device performs uploading matched re-synchronization point data.

14. The electronic device of claim 11, wherein the re-synchronization process is performed on all delay steps during a period of the alternative calibration.

15. The electronic device of claim 11, wherein, in response to the re-synchronization not being completed at a predetermined delay step during the re-synchronization process, the delay step is changed to a next delay step and then re-synchronization process is performed again.

16. The electronic device of claim 11, wherein, in response to the synchronization between the reception data and the pattern data matching, the re-synchronization process is not performed.

17. A calibration method for an electronic device, comprising:

performing preamble calibration using a first electronic device and a second electronic device;

checking, after the performing of the preamble calibration, a random pattern from the first electronic device using the second electronic device;

performing an alternative calibration in response to the random pattern being confirmed;

checking for occurrence of a noisy clock signal during the alternative calibration;

performing a re-synchronization process to resume the alternative calibration in response to the noisy clock signal occurring; and continuing to perform the alternative calibration in response to the re-synchronization process being completed.

18. The calibration method of claim 17, wherein the performing of the alternative calibration comprises:

comparing data synchronization between the reception data transmitted from the first electronic device and the pattern data of the second electronic device; and continuing to perform the alternative calibration if the data synchronization matches as a result of the comparison.

19. The calibration method of claim 17, wherein the performing of the re-synchronization process comprises:

comparing the reception data transmitted from the first electronic device with pre-generated re-synchronization point data; and completing the re-synchronization process if data synchronization matches as a result of the comparison.

20. The calibration method of claim 19, comprising:

changing a delay step in response to the data synchronization mismatching;

searching for a re-synchronization point at the changed delay step; and performing the re-synchronization process again using the searched re-synchronization point.

* * * * *